April 13, 1965 D. C. PILKINTON 3,178,518

TRUNK MAKE BUSY CIRCUIT

Filed July 11, 1961

INVENTOR
D. C. PILKINTON
BY F. R. McCorkendale
ATTORNEY 3,178,518

TRUNK MAKE BUSY CIRCUIT

Donald C. Pilkinton, Metuchen, N.J., assignor to Bell Telephone Laboratories, Incorporated, New York, N.Y., a corporation of New York Filed July 11, 1961, Ser. No. 123,298
8 Claims. (Cl. 179—42)

Figure 1:
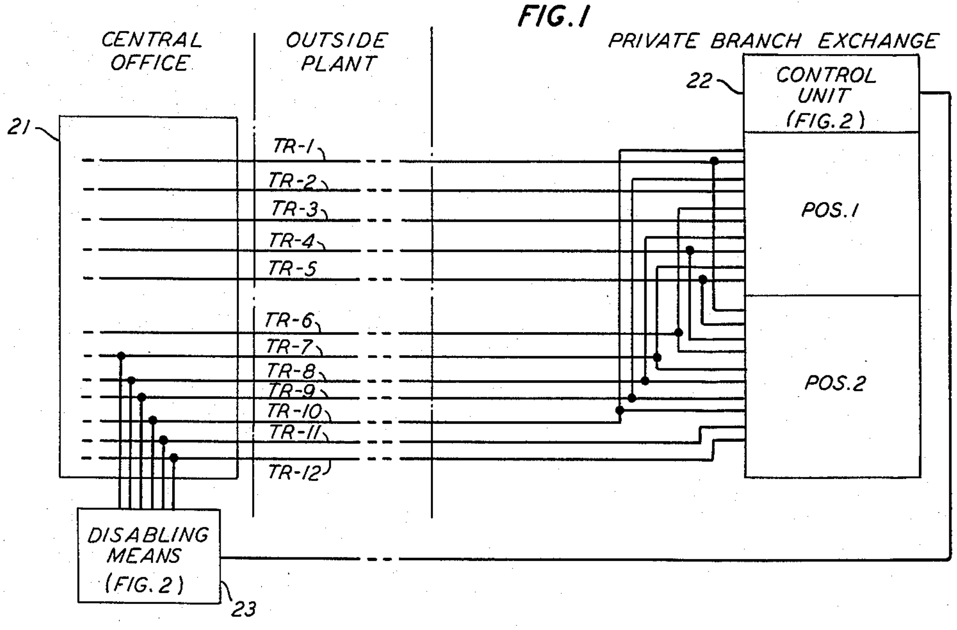

This invention relates to a trunk make busy circuit and more particularly to a trunk make busy circuit for controlling calls incoming to a private branch exchange.

In private branch exchange installations, commonly referred to as PBX's, of the type serving a relatively large number of extensions, for example several hundred, it is usual to provide a multiposition switchboard. The trunks between the central office and the PBX terminate at the switchboard and are divided among the several positions, each trunk normally being multipled with an appearance at two or more positions. During the normally heavy traffic portions of the day, each position is usually attended by an operator in order that prompt attention may be given both to all of the trunks and to the inside phones or extensions. However, during normally slack periods, the number of attendants is reduced and in many instances there may be only one attendant for the entire board.

It is a well recognized fact that a caller to a PBX reacts very unfavorably when his call is not responded to promptly, that is when it appears to him, at least, that the attendant is ignoring his attempted call. This same reaction does not result, however, when he receives a "busy tone"; there he may feel irritated at not being able to get his call through promptly, but he has, of course, no reason to feel that his call is being ignored by the PBX attendant.

Obviously, when a multiposition switchboard is attended by less than the full complement of operators, possibly by only a single attendant, prompt attention cannot be given to all the trunks and it is inevitable that callers will frequently experience delayed response to their calls. That is, they will hear the ringing tone, indicating to them that their call has reached the PBX, but may not receive a reasonably prompt response by the attendant. As indicated above this is a situation which is apt to create an unfavorable opinion of the PBX customer on the part of the caller and one which it is therefore desirable to avoid.

Accordingly, it is an object of my invention to improve the operation of private branch exchange systems.

A more specific object of the invention is to prevent indications to persons calling a PBX that their calls are not being given prompt attention.

A still more specific object of the invention is to temporarily render selected trunks inaccessible to incoming calls and to artificially "busy" such selected trunks.

In accordance with a specific embodiment of the invention selected trunks, a number predetermined by the PBX customer, may be temporarily rendered inaccessible to incoming calls for desired periods. This is usually done during normally slack periods when the switchboard is attended at only one position and the arrangement preferably is such that the trunks left accessible to incoming calls are concentrated at the attended position. The trunks to be controlled are grouped according to local traffic conditions, for example, each group may comprise three trunks. A circuit unit comprising a transistor and an AND circuit is provided for each trunk group with the sleeve of each trunk connected to a respective input lead of the AND circuit. Each AND circuit operates only when all the trunks in the associated group are idle, or become idle, and battery, rather than ground, is connected to each input of the AND circuit. When an AND circuit operates, the associated sleeve leads are opened and ground is connected toward the connector bank multiple circuit whereby to artificially "busy" the trunk to incoming calls.

It is a feature of the present invention that the trunks to be controlled are divided into a plurality of groups and that the controlling function is exercised with regard to each respective group only when all trunks in the respective group are idle.

A further feature of the invention is means whereby the grouping of the controlled trunks may be readily changed with regard to number of trunks included.

A still further feature of the invention is means activated by a single key operation effective without further supervision to remove each group of controlled trunks from service as soon as all trunks of the group become idle.

Yet another feature of the invention is means for rendering trunk groups inaccessible to incoming calls without disturbing their availability for outgoing service from the PBX.

Figure 2:
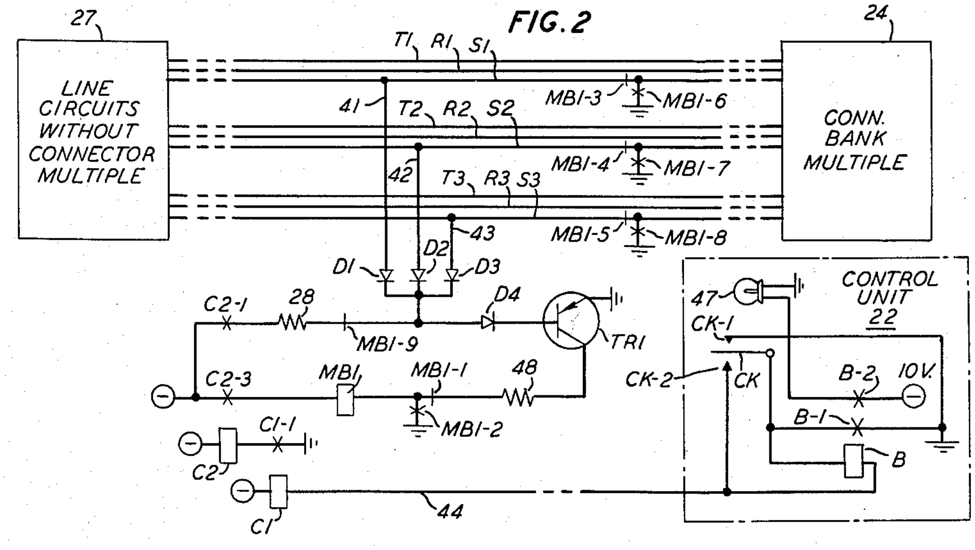

A full understanding of the arrangement contemplated by the present invention as well as an appreciation of the various features thereof may be gained from consideration of the following detailed description in connection with the accompanying drawing in which:

FIG. 1 shows schematically a typical arrangement of a plurality of central office trunks connected to two positions of a PBX switchboard with the disabling means of the present invention connected to selected ones of the trunks; and FIG. 2 shows the arrangement of the control unit and of one trunk disabling and make busy circuit utilized in one specific illustrative embodiment of the invention.

Referring now to the drawing, and first to FIG. 1, there is schematically illustrated the connection of twelve central office trunks (an arbitrarily selected number) from central office 21 over the usual outside plant facilities to positions No. 1 and No. 2 of the PBX switchboard. It will be understood that during periods of normal traffic conditions both position No. 1 and position No. 2 of the switchboard will be attended and the arrangement and multiplying of the twelve trunks is such that there are ten trunk appearances at each position. Thus, trunks TR–2 and TR–3 are terminated at position No. 1 alone and trunks TR–11 and TR–12 are terminated at position No. 2 alone, while the remaining trunks TR–1, TR–4, TR–5, TR–6, TR–7, TR–8, TR–9 and TR–10 each have an appearance at both positions. Normally, therefore, the load should be evenly distributed between the two positions since the majority of the trunks can be handled by whichever attendant is idle at the moment.

Let it be assumed now that during slack periods only position No. 1 is to be attended and that the PBX customer wishes to withdraw from service to incoming calls six of the trunks in order to prevent the possibility of delayed responses to incoming calls. The number of trunks to be controlled, here assumed to be six, is determined by the PBX customer as dictated by local conditions.

Actuation of control unit 22 provided at the PBX (shown in detail in FIG. 2 and described subsequently) causes operation of disabling means 23 (also shown in FIG. 2 and described subsequently) to open trunks TR–7 to TR–12, inclusive, at the same time applying ground thereto in the direction of the connector bank multiple whereby to artificially "busy" the trunks with regard to incoming calls. It will be noted that the six uncontrolled trunks, that is, those left accessible to incoming calls, all terminate at position No. 1 and it will be understood that, with regard to those "controlled" trunks which have multiple appearances at position No. 1, the associated trunk lamps will not light in the event of attempted calls thereover since the trunks are open. The attendant at position No. 1 has responsibility, therefore, only for trunks TR–1 to TR–6, inclusive, all terminating at her position, and she should be able to handle the trunk calls promptly. With regard to calls attempted on trunks TR–7 to TR–12, inclusive, on the other hand, the caller will receive a busy signal rather than a prolonged ringing tone which might well be the case if the trunks were left in service and the single attendant (at position No. 1) was unable to give prompt attention to this group of trunks.

As will be clear from the subsequent description in connection with FIG. 2, the controlled group of trunks may be again made accessible at any desired time by a further operation of control unit 22.

Due to the changing local traffic conditions, the PBX customer may find it desirable to change the number of controlled trunks from time to time and this may be easily accomplished with the novel arrangement contemplated by the invention. Also, as will be apparent from the following description with reference to FIG. 2, the grouping of the controlled trunks can be readily changed as local traffic conditions require.

Referring now to FIG. 2, portions of three controlled trunks at the central office are shown; for example, the trunks illustrated might correspond to trunks TR–7, TR–8 and TR–9 referred to above. Each trunk includes a tip lead, T1, T2 and T3, respectively, a ring lead, R1, R2 and R3, respectively, and a sleeve lead S1, S2 and S3, respectively. Control unit 22, which is located at the PBX is also shown.

The trunks are assumed to be two-way trunks, that is, serving both for calls incoming to the PBX from the central office and outgoing to the central office from the PBX, and the portions of the trunks illustrated are those portions between the connector bank multiple, indicated by box 24, and the line circuits without connector multiple, indicated by box 27. In the illustrated embodiment, the controlled trunks are assumed to be grouped in "threes," one of these groups being that shown in FIG. 2.

The disabling or control means includes an AND gate, the three parallel input leads 41, 42 and 43, being connected respectively, to sleeve lead S1 of the first trunk, sleeve lead S2 of the second trunk and sleeve lead S3 of the third trunk; diodes D1, D2 and D3 are connected in the respective input leads of the gate. Diode D4, which is connected in the base circuit of transistor TR1, is of the so-designated Zener type.

For purposes of further description, let us assume that at this point the PBX customer desires to render the illustrated group of three trunks inaccessible to incoming calls and, accordingly, operates her control key CK, provided at the PBX, to close make contact CK–1. This completes a path for operation of relays B (at the PBX) and C1 (at the central office), this path being traced from ground, make contact CK–1 of control key CK, winding of relay B, line 44 to the central office, winding of relay C1 to battery; relays B and C1 operate.

Relay B, upon operating, holds through its make contact B–1 to ground and completes through its make contact B–2 an obvious energizing path for indicator lamp 47.

Relay C1, upon operating, completes through its make contact C1–1 an obvious operating path for relay C2; relay C2 operates.

It is well known that in automatic telephone systems of the general nature with which the arrangement of the present invention is intended to be used, ground will be found on the sleeve terminals of all busy lines while battery will be found on the same terminals of all idle lines. That is, in the case of the group of trunks illustrated, if one or more be busy, ground will be connected to the respective sleeve, S1, S2, or S3, while battery will be connected to the sleeve of all idle lines. This is well known practice and means for carrying out such circuit operations is disclosed, for example, in S. Uda et al. Patent 1,925,681, September 5, 1933.

Relay C2, operated as above described, applies energizing battery through its C2–1 make contact to the AND gate comprising diodes D1, D2 and D3 and resistor 28, and also connects battery through its C2–3 make contact, winding and break contact MB1–1 of relay MB1, resistor 48, transistor TR1 to ground.

As shown, the output of the AND gate is applied to the base of transistor TR1 through Zener diode D4. Assuming first that one of the trunks is busy, the sleeve lead, here assumed to be S3, will be grounded and ground will be connected to input lead 43 of the AND gate. As is well known in the art an AND gate produces an output only when all of its input leads are energized, and ground at one or more of its inputs prevents the gate from operating. Therefore in the present instance, with ground applied to input lead 43, the base lead of transistor TR1 is effectively open and insufficient current flows through relay MB1 to cause its operation. While any one or more of the illustrated three trunks comprising the group are in busy condition, therefore, the group remains enabled.

Let us assume now for purposes of further description that all three trunks of the illustrated group are in idle condition and that battery is connected to all three sleeves S1, S2 and S3. Connection of battery potential to all three input leads 41, 42 and 43 results in a high output from the AND gate and Zener diode D4 breaks down allowing current to flow in the base lead of the transistor TR1 which assumes ON condition. This allows full flow of current in the collector-emitter path of the transistor and the flow of current through relay MB1 is now sufficient to cause operation of that relay.

Relay MB1, upon operating, holds to ground through its make contact MB1–2, make contact C2–3 of relay C2 also being included in this locking path. Also, relay MB1 operated opens the sleeve leads S1, S2 and S3 at respective break contacts MB1–3, MB1–4 and MB1–5. The three trunks in question are thus rendered inaccessible to incoming calls, and, at the same time, the trunks are in effect artificially "busied" by applying ground over the sleeves toward the connector bank multiple through make contacts MB1–6, MB1–7 and MB1–8 of the operated MB1 relay. The break contacts preferably operate before the corresponding make contacts so that the sleeve leads are opened before connecting ground thereto. At this time, also, the path over which potential was previously supplied to the AND gate is opened at break contact MB1–9 of relay MB1.

At this time, therefore, persons attempting calls to the PBX, which incoming calls enter by way of the connector bank multiple 24, will receive a busy signal and must await the availability of an uncontrolled trunk before their call can be completed. In the meantime, however, they will not experience a long waiting period on an apparently unserviced trunk such as would probably be the case if all twelve trunks remained accessible to incoming calls even though only one position were attended.

Since outgoing calls from the PBX extensions reach the trunks through the line circuits without connector multiple (indicated by box 27) the controlled trunks are still available for such calls.

At any desired time the group of trunks can be restored to normal service by operation at the PBX of control key CK to close contact CK–2. This shunts the operating path of relay B which releases and removes at its make contact B–1 the previous holding path for itself and for relay C1 which also releases. Relay B, upon releasing, also interrupts the enregizing path for indicator lamp 47, and relay C1, upon releasing, interrupts the operating path for relay C2 which releases and restores the circuit to normal.

It will be apparent from the above description that only a single key operation is required on the part of the attendant to institute the operation of the disabling means. It will be apparent further, however, that even though the action is instituted by operation of the CK key, the disabling action for the group of trunks does not actually take place until all three of the trunks are in idle condition. Interference with existing connections is therefore prevented. Under certain traffic conditions it might be found that with three trunks in a group, the operation of the disabling means was being unduly delayed awaiting a condition when all three were simultaneously idle. Again, under different traffic conditions it might be found that more than three trunks could be included in each group without unduly slowing the operation of the circuit. In general, of course, the greater the number of lines per group, the less the chance that all will be idle when operation of the cricuit is initiated or that all will be simultaneously idle within a given period. According to a particularly desirable feature of the novel arrangement contemplated by my invention, the size of the group can be conveniently changed simply by decreasing or increasing the number of the input leads of the AND circuit.

It will be understood that in reference to FIG. 2 as many groups of trunks as desired may be controlled by control unit 22; additional disabling circuits will be controlled by respective pairs of make contacts of the C2 relay corresponding to make contacts C2–1 and C2–3 of the illustrated embodiment. As pointed out above, the number of trunks to be controlled and the grouping thereof are prearranged in accordance with the requirements of the PBX customer.

A particularly desirable feature of the arrangement is that a very small current, less than one milliampere, is drawn from a busy sleeve by the connection of the disabling and make busy circuit. Also, it will be readily apparent that the novel arrangement described wherein the controlled trunks are handled in a plurality of groups affords ready means for changing the operation as changes in traffic conditions dictate. That is, as indicated above, if the functioning appears to be too slow, the size of the trunk groups can be reduced, while on the other hand, if conditions appear to warrant a change in the other direction the size of the groups can be increased. In this way the most efficient operation for a given traffic condition can be maintained. This advantage is not provided, of course, in previously known concentrating systems wherein each line is treated individually so far as awaiting its idle condition is concerned. A system of this type is disclosed, for example, in S. W. Allison Patent 2,115,-133, April 26, 1938.

While a specific embodiment of the invention has been selected for detailed disclosure, the invention is not, of course, limited in its application to the embodiment disclosed. The embodiment which has been described should be taken as illustrative rather than restrictive thereof.

I claim:

1. In a telephone system, a central office, a private branch exchange, and a plurality of trunk lines connecting said central office and said private branch exchange, a plurality of attendants' positions at said private branch exchange, means for terminating said trunk lines at said attendants' positions, means for dividing a predetermined number of said trunk lines into groups with a predetermined number of lines in each group, means at said central office effective when operated for rendering each of said lines included in a respective one of said groups inaccessible to calls incoming to said private branch exchange from said central office, and means for operating said rendering means when all the lines of such respective group become idle.

2. In a telephone system, a central office, a private branch exchange, and a plurality of two-way trunk lines connecting said central office and said private branch exchange for calls through said central office to said private branch exchange and for calls originating at said private branch exchange to said central office, a predetermined number of said trunk lines being divided into groups with a predetermined number of lines in each group, means at said central office effective when operated for rendering each of said lines included in a respective one of said groups inaccessible to calls incoming to said private branch exchange from said central office while said lines remain accessible to calls originating at said private branch exchange, and means for operating said rendering means when all the lines of such respective group become idle.

3. In a telephone system, a central office, a private branch exchange and a group of trunk lines connecting said central office and said private branch exchange, a diode AND gate connected to said group of trunk lines, means for producing current in the output circuit of said AND gate when all of said trunk lines are in idle condition and for retarding the flow of current in said output when any one of said trunk lines is in busy condition, and means operated by current flow in said output circuit for disabling said trunk lines with regard to calls incoming to said private branch exchange from said central office.

4. In a telephone system, the combination defined by claim 3 further characterized in that said last-mentioned means includes a relay and a transistor for controlling the flow of energizing current to said relay.

5. In a telephone system, a central office, a private branch exchange and a group of trunk lines connecting said central office and said private branch exchange, a diode AND gate connected to said group of trunk lines, means for producing current in the output circuit of said AND gate when all of said trunk lines are in idle condition and for retarding the flow of current in said output circuit when any one of said trunk lines is in busy condition, and means operated by current flow in said output circuit for disabling said trunk lines with regard to calls incoming to said private branch exchange from said central office, said last-mentioned means including a transistor having its base circuit connected in the output circuit of said AND gate, a first relay having break contacts connected in respective leads of said trunk lines and a second relay for controlling the application of energizing current to the operating path of said first relay, completion of the operating path being controlled by operation of said transistor.

6. In a telephone system, a central office, a private branch exchange and a group of trunk lines connecting said central office and said private branch exchange, a diode AND gate connected to said group of trunk lines, means for producing current in the output circuit of said AND gate when all of said trunk lines are in idle condition and for retarding the flow of current in said output circuit when any one of said trunk lines is in busy condition, and means operated by current flow in said output circuit for disabling said trunk lines with regard to calls incoming to said private branch exchange from said central office, said last-mentioned means including a transistor having its base circuit connected in the output circuit of said AND gate, a first relay having break contacts connected in respective leads of said trunk lines, a second relay for controlling the application of energizing current to the operating path of said first relay, completion of the operating path being controlled by operation of said transistor, a third relay for controlling operation of said second relay, and means at said private branch exchange for operating said third relay, completing a locking path to hold said third relay operated, and interrupting said locking path to release said third relay.

7. In a telephone system, a private branch exchange, a central office, and a group of trunk lines connecting said private branch exchange and said central office, each of said trunk lines including a sleeve lead which is connected to ground when the respective line is busy and connected to battery when the respective line is idle, means at said central office for rendering said group of trunk lines inaccessible to calls from said central office to said private branch exchange comprising a diode AND gate having each parallel input lead connected to a respective sleeve lead of said trunk lines, means for producing current in the output circuit of said diode AND gate when battery is applied to all of said parallel input leads, and means controlled by the current flow in the output of said AND gate for opening the sleeve lead of each of said trunk lines.

8. In a telephone system, the combination defined by claim 7 further characterized in that said last-mentioned means includes a relay and a transistor for controlling the supply of energizing current to said relay.

References Cited by the Examiner

UNITED STATES PATENTS

| | | | |
|---|---|---|---|
| 2,299,898 | 10/42 | Holden | 179—18 |
| 2,300,618 | 11/42 | Dahl | 179—27 |
| 2,866,005 | 12/58 | Kupferle | 179—18 |

ROBERT H. ROSE, *Primary Examiner.*

WALTER L. LYNDE, WILLIAM C. COOPER, *Examiners.*